Nov. 29, 1966   H. R. SMITH, JR   3,288,594
PURIFICATION OF METALS
Filed Dec. 5, 1963   3 Sheets-Sheet 3
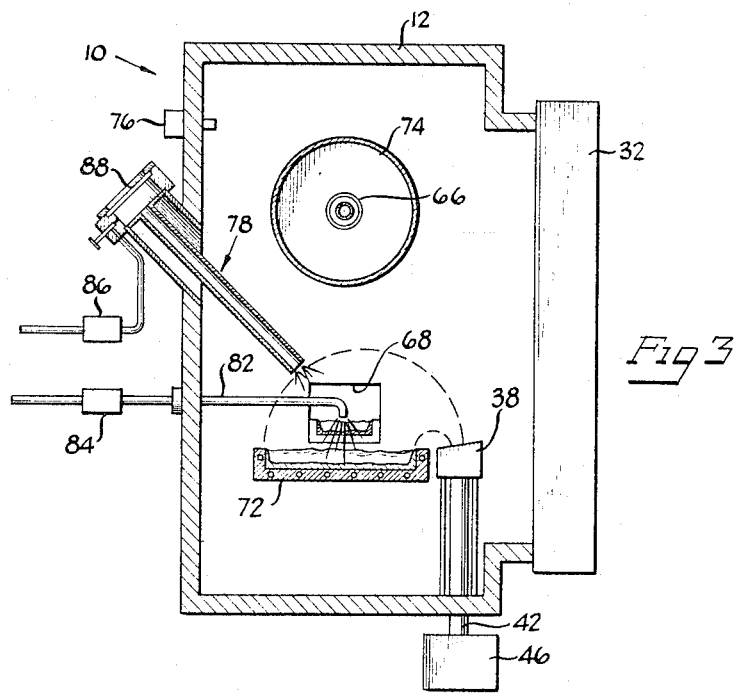
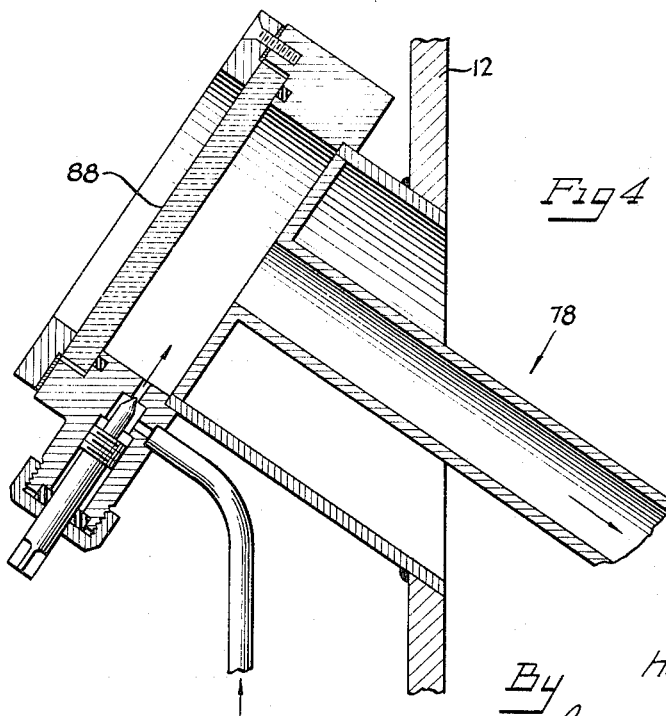
Inventor
Hugh R. Smith, Jr.
By Anderson, Luedeka, Fitch, Even & Tabin
Atty's

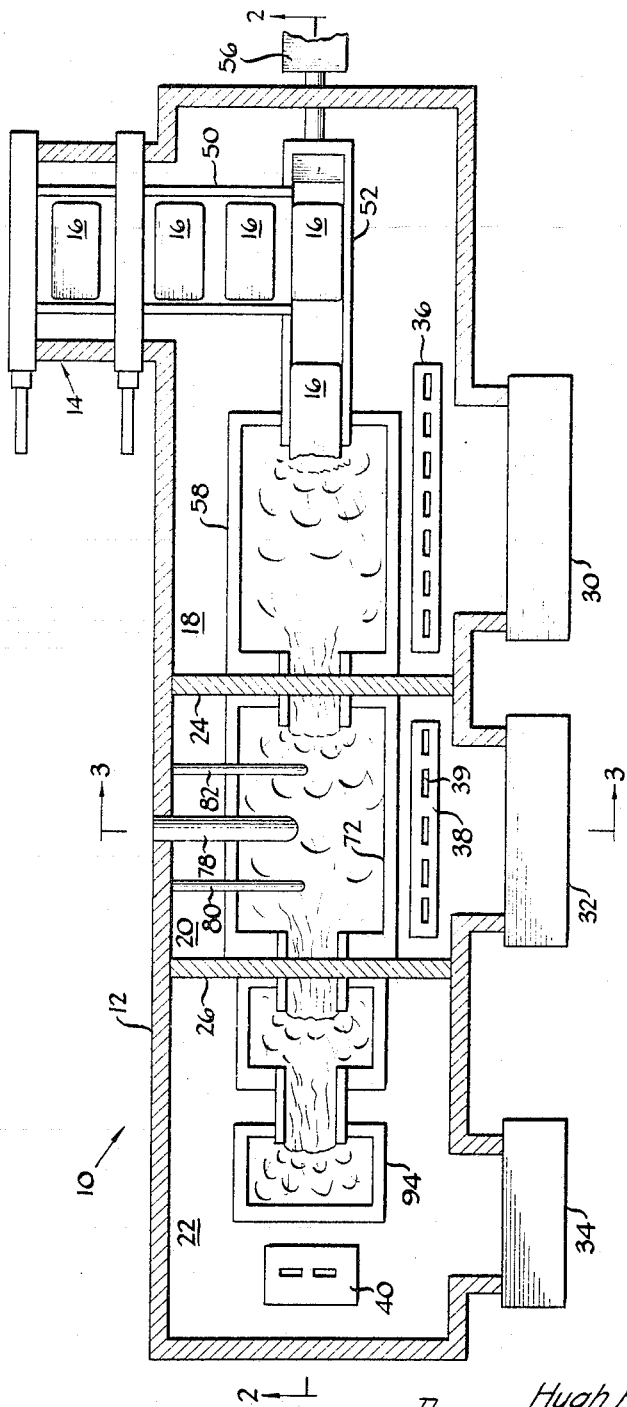

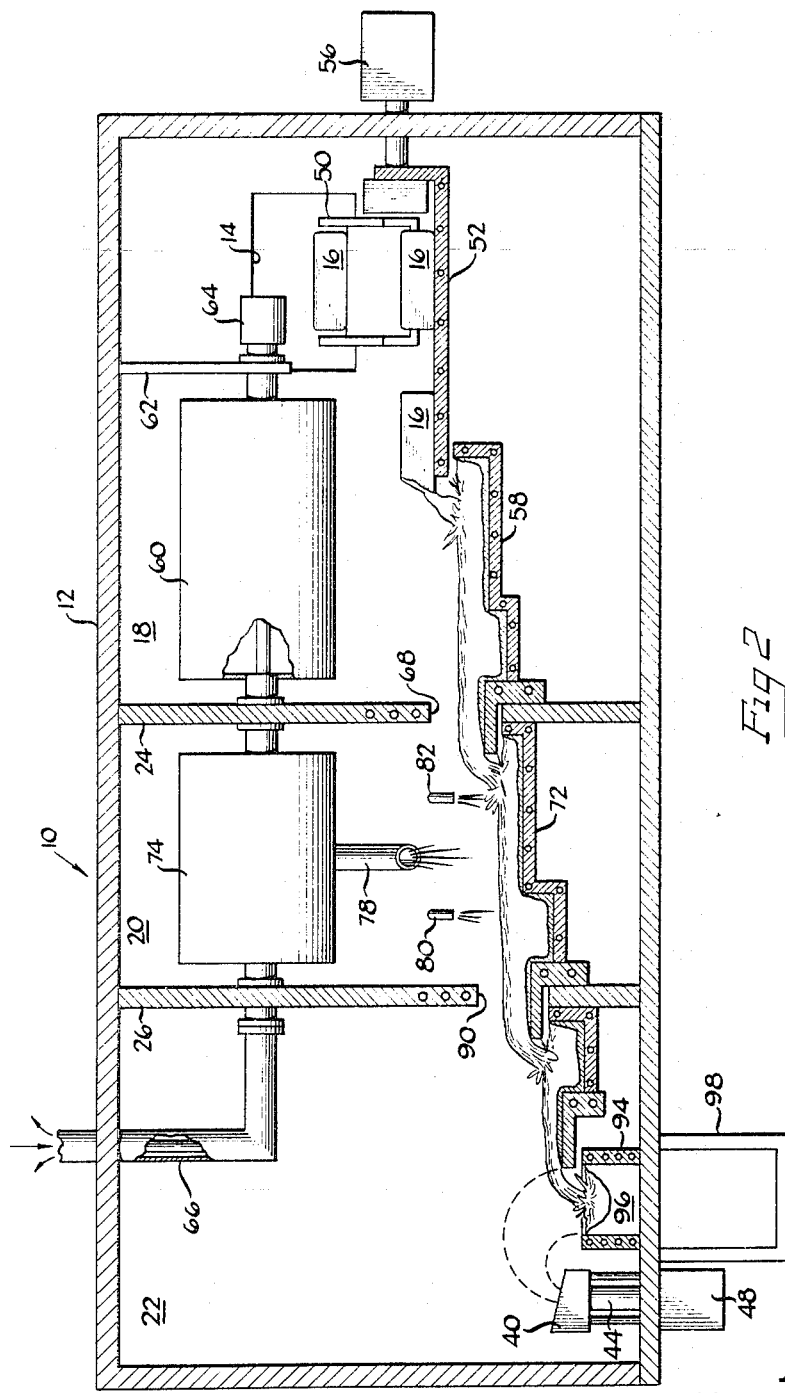

United States Patent Office 3,288,594
Patented Nov. 29, 1966

3,288,594
PURIFICATION OF METALS
Hugh R. Smith, Jr., Piedmont, Calif., assignor to United Metallurgical Corporation, Berkeley, Calif., a corporation of California
Filed Dec. 5, 1963, Ser. No. 328,277
8 Claims. (Cl. 75—84)

This invention relates to the production of relatively pure metals and metal alloys, and more particularly relates to an economical method for the production of such relatively pure metals and metal alloys.

The purification of metals and alloys has long presented a problem to metallurgists; and, although processes for producing most metals and alloys have been generally set forth, these processes frequently involve apparatus and process conditions that prevent the production of certain metals and alloys in highly purified form at reasonable costs. Technological and scientific advances of recent years have developed new uses for some of the heretofore expensive metals if they could be produced in highly purified form at lower costs.

Conventional processes for refining metals include electrolysis and distillation among other techniques. Although electrolysis can be used to produce metals of very high purity, contamination of the metals by constituents of the electrolyte, as well as by the materials of construction of the electrolytic cell causes severe problems. Distillation processes invariably involve very high operating costs because of the difficulty of supplying the required quantity of heat to the crude feedstock at a rate which is sufficient to cause a rapid distillation of the feedstock. Distillation processes are also generally disadvantageous due to the materials of construction problems associated with high temperature purification processes involving metals and metal compounds.

In recent years many of the problems associated with the production of highly purified metals have been solved by the use of electron beam purification techniques. The electron beam purification of metals is generally effected in an electron beam furnace at high vacuum. An electron beam furnace can be operated at pressures approaching one-tenth of one micron of mercury or less and electron beam purification has the desirable characteristics of a complete absence of a reactive atmosphere and the absence of any materials in contact with the raw material feedstock which may introduce impurities into the metal during the purification process. Electron beam purification processes may be employed to separate metals and metal alloys from those impurities associated therewith which have volatilities at the operating conditions of the electron beam furnace substantially different from the volatility of the metal or metal alloy being purified. However, electron beam purification processes previously have not been employed to separate metals from impurities which have a volatility at the operating conditions of the furnace closely similar to or less than the volatility of the desired metal or metal alloy.

It is a principal object of the present invention to provide an economical method for the production of metals and metal alloys of high purity from low cost raw materials.

It is another object to provide an economical method for the production and purification of metals of a high degree of purity which has heretofore been unobtainable except at high cost. An additional object is to provide a continuous method for the production of relatively pure metals and alloys in an electron beam furnace. A further object is to provide a method for the electron beam purification of metals, which method provides for the separation of impurities that have heretofore not been separable in an electron beam purification process.

These and other objects of the invention are more particularly set forth in the following detailed description and in the accompanying drawings of which:

FIGURE 1 is a partial schematic plan view of one form of apparatus for carrying out the method of the present invention;

FIGURE 2 is a fragmentary vertical cross sectional view of the apparatus of FIGURE 1 taken generally along line 2—2 of FIGURE 1;

FIGURE 3 is an enlarged fragmentary vertical cross sectional view generally taken along line 3—3 of FIGURE 1; and FIGURE 4 is an enlarged fragmentary vertical cross sectional view of the viewing apparatus illustrated in FIGURE 3.

Very generally, the method of the present invention comprises the purification of metals by contacting a molten pool of the desired metal with a reactive gas while maintaining the molten pool in a region of reduced pressure. More specifically, the present invention relates to a method for the manufacture of a highly purified metal or metal alloy from a mixture of the desired metal and an impurity substance that cannot be readily vaporized from the mixture without causing substantial vaporization of the desired metal, which method comprises the steps of melting the mixture in an electron beam furnace at a reduced pressure of not more than 1000 microns of mercury and at a temperature sufficient to provide a molten pool of the mixture at the reduced pressure, contacting the molten pool with a reactive gas capable of reacting with the impurity substance to form a compound that is vaporizable at the operating temperature and pressure, and recovering the desired metal in purified form.

The term "vaporized" or "vaporizable," as used herein to describe a particular substance, means that the compound may be evolved or distilled from a molten pool of a mixture of the substance and a desired metal or metal alloy without causing the evolution of a substantial amount of the desired metal.

The method of the present invention is particularly suited for use as a final purification step in the electron beam purification of metals and metal alloys to remove impurities that cannot be removed from the metals according to known electron beam purification techniques.

Any metal that may be purified by an electron beam purification process may be purified in accordance with the method of the present invention. Refractory metals that have heretofore been difficult to obtain in highly purified form, such as vanadium, columbium, tantalum, molybdenum, tungsten, zirconium, hafnium and rhenium (hereinafter referred to as refractory metals) are particularly suitable. The lanthanide and actinide rare earth metals may also be purified by the described process.

In a conventional electron beam purification process, an oxide raw material feedstock of the desired metal is mixed with a reducing agent which forms a volatile suboxide and is introduced into a region of reduced pressure within an electron beam furnace where it is heated to a temperature so that a molten pool of reactants is formed. The pressure and temperature within the electron beam furnace are selected so that substantially all of the vaporizable impurities and reducing agent suboxides present in the raw material feedstock are vaporized from the molten pool of reactants without vaporizing a substantial amount of the desired metal. Generally, the pressure in the electron beam furnace is maintained at or below 2 microns of mercury by suitable vacuum diffusion pumps, usually below one micron of mercury and preferably not more than 0.1 micron of mercury. A process of this type is described in the copending application of Smith et al., Serial No. 322,470, filed November 8, 1963.

However, in some instances the molten pool of reactants will contain certain non-vaporizable impurity substances which cannot be vaporized therefrom without vaporizing a substantial amount of the desired metal.

For example, when a silicon reducing agent is employed in the electron beam purification of refractory metal, lanthanide rare earth metal, or actinide rare earth metal oxide ores, undesirable amounts of silicon may remain in the molten pool of the desired metal after substantially all of the oxide and other impurities have been vaporized. The silicon cannot be vaporized from the desired metal as free silicon without vaporizing a substantial amount of of the desired metal. Likewise, if an excessive amount of zirconium is present in a molten pool of columbium, the the zirconium cannot be vaporized therefrom as free zirconium.

In accordance with the method of the present invention, in such instances, the molten pool of reactants is contacted with a reactive gas. The reactive gas reacts with the impurity substance, e.g., silicon, or zirconium, to form a compound which is vaporized from the molten pool of the desired metal at the operating conditions of the electron beam furnace.

When the impurity substance is a metal, such as silicon or zirconium, which forms a vaporizable suboxide, e.g., silicon monoxide or zirconium monoxide, at the reduced pressure and elevated temperature within the electron beam furnace, the reactive gas is desirably oxygen. The oxygen, upon contacting the molten pool, reacts with the impurity metal to form a suboxide which is vaporizable at the operating conditions within the electron beam furnace. The suboxide, e.g., silicon monoxide, may be condensed upon a cool condenser surface positioned within the electron beam furnace or is condensed upon the cool walls of the furnace. At the operating conditions of the electron beam furnace the gaseous oxygen contacting the molten pool also reacts with any carbon present therein to form carbon monoxide which is also vaporizable at the operating conditions within the furnace. Since carbon monoxide is non-condensible, it is removed from the electron beam furnace by the vacuum pumps.

It has also been found that other impurities such as oxygen and sulfur, which may be reacted to form vaporizable compounds, may be removed from a molten pool of reactants in an electron beam purification apparatus by contacting the molten pool of reactants with a reactive gas. In this connection, a hydrocarbon gas such as methane, ethane or propane or any other gas that is reactive at the operating conditions may be contacted with the molten pool to remove oxygen and sulfur therefrom. The carbon of the hydrocarbon gas reacts with oxygen to form carbon monoxide, and reacts with sulfur to form carbon monosulfide, the most prevalent form of the carbon-sulfide system at temperatures above 1200° C. to 1300° C. Both carbon monoxide and carbon monosulfide are vaporizable at the operating conditions within the electron beam furnace, the carbon monoxide being removed from the furnace by the vacuum pumps and the carbon monosulfide being condensed on the cool surfaces within the furnace, e.g., upon the condenser surface.

The molten pool of reactants may be contacted with oxygen and a hydrocarbon gas successively or at the same time if desired to remove certain combinations of impurity substances. In such instances where the molten pool of reactants is contacted with oxygen to remove metal impurities, undesirable amounts of oxygen may dissolve in the molten pool of reactants. The molten reactants may then be contacted with a hydrocarbon gas, e.g., methane, to remove the oxygen from the desired metal. However, if the desired metal, e.g., columbium, lanthanide rare earth metals and actinide rare earth metals, forms a volatile oxide that is vaporizable at the operating conditions, the oxygen may be vaporized from the desired metal in the form of an oxide of the desired metal and the use of a hydrocarbon reactive gas to remove dissolved oxygen is unnecessary.

The amount of reactive gas employed, and the pressure of the reactive gas within the electron beam purification apparatus, may vary widely. The pressure of the reactive gas may be as low as 0.001 micron of mercury and may be as high as 1 millimeter of mercury or more. As used herein, the reactive gas pressure is measured as the increase in the total pressure within the electron beam furnace measured at a distance spaced from the surface of the molten pool and above the blanket of reactive gas that is present just above the surface of the molten pool. The total pressure within the electron beam furnace is also measured at this point, i.e., at a point apart from the reactive gas zone.

The pressure of the reactive gas closely adjacent the surface of the molten pool may be substantially greater than the total pressure within the electron beam furnace. In this connection, it has been found that the total pressure within the electron beam furnace at a point spaced from the surface of the molten pool is not substantially increased even though the pressure of the reactive gas adjacent the molten pool may be as much as 50–100 times the total pressure in the furnace. It is believed that the total furnace pressure is reduced due to the gettering action of the materials condensing upon the condenser or cool surfaces in the furnace. For example, oxygen may be introduced into an electron beam furnace in the purification of columbium containing silicon impurities so that the increase in the total pressure in the furnace at a point spaced from the molten pool of columbium is increased about 0.1 micron of mercury. If the electron beam guns are then turned off and the molten columbium is allowed to solidify, the total pressure quickly rises to 10 microns or more. Thus, the vaporization and condensation of silicon monoxide and columbium monoxide acts as a getter for the oxygen gas introduced into the furnace.

An increase in the total pressure within the electron beam furnace of about 0.1 micron to two microns of mercury at a point spaced from the surface of the molten pool provides a substantial rate of vaporization of the impurity substance from the molten pool of reactants and provides a highly purified metal product. The permissible upper limit for the reactive gas pressure appears to be limited only by the ability to generate a stable electron beam. When the electron beam generating apparatus is separately evacuated by vacuum pumps, as described hereinafter, the permissible upper pressure limit of the reactive gas may exceed about 1 millimeter of mercury.

The rate of vaporization of the impurity substance is proportional to the pressure of the reactive gas within the purification apparatus, i.e., the greater the reactive gas pressure the greater the rate of vaporization of the impurity substance. Thus, the pressure of the reactive gas within the purification apparatus may also be controlled in response to amount of the impurity substance present in the molten pool of reactants.

The desired metal may be partially purified according to known electron beam purification processes before being finally purified in accordance with the described method. In this connection, the raw material feedstock may comprise a mixture of a crude metallic oxide ore and a reducing agent which is initially reacted in an electron beam apparatus accompanied by the vaporization of reducing agent suboxides and other volatile impurities which are condensed upon a condenser surface within the purification apparatus as described in the aforementioned Serial No. 322,470. After substantially all of the vaporizable impurities have been vaporized from the molten pool of the desired metal, the molten pool may then be contacted with a reactive gas in accordance with the method of the present invention to remove the non-vaporizable impurities therein. The reactive gas purification step may be employed as a final step in a continuous purification process in an electron beam furnace having a plurality of purification regions. Alternately, the desired metal may be first purified in an electron beam furnace without the use of a reactive gas and solidified in ingot form, after which the ingot may be remelted in a subsequent electron beam purification step and contacted with a reactive gas.

The raw material feedstock introduced into the electron beam purification apparatus may also comprise a crude intermediate product obtained from a conventional atmospheric or thermite purification process, also as described in the aforementioned Serial No. 322,470. In such instances, the metallic oxide ore is purified according to known procedures in an atmospheric reduction stage in which a substantial portion of the impurities are removed as slag. The crude intermediate product obtained from the atmospheric process is then introduced into an electron beam purification apparatus and melted at a suitable temperature whereupon the remaining portions of the vaporizable impurities are vaporized. After all of the vaporizable impurities have been vaporized the molten pool containing the desired metal may be contacted with a reactive gas to remove certain non-vaporizable impurities as described herein.

The only known operable apparatus for carrying out the described purification process to the high degree of purity contemplated is an electron beam furnace.

Now referring to the drawings in detail, there is shown in FIGURE 1 a preferred form of an electron beam furnace 10. The furnace 10 is particularly suited for the continuous purification of a refractory metal, e.g., columbium, directly from a metallic oxide ore with a reducing agent and will be described as such. The apparatus shown in the drawings is best suited for a batch process, although the apparatus may be readily modified as described hereinafter in order to conveniently practice a continuous process. The furnace 10 is in the form of an elongated vacuum-tight tank 12, and has a vacuum lock inlet 14 of conventional design through which a raw material feedstock 16 enters the furnace. The furnace 10 is divided into three regions, a melting region 18, a purification region 20 and a casting region 22, which regions are formed by a pair of spaced apart walls 24 and 26 disposed intermediate the end walls of the tank 12. Alternately, as described herein, the electron beam furnace may contain a single region or any number of regions, as desired.

Each of the regions 18, 20 and 22 is maintained at a reduced pressure by suitable conventional vacuum diffusion pumps, indicated generally at 30, 32 and 34. In some instances it may be possible to employ a conventional mechanical blower such as a Roots blower in place of the vacuum diffusion pumps. The vacuum pumps 30, 32 and 34 may be suitably adjusted to maintain the same or different pressures in the respective regions 18, 20 and 22 of the furnace 10. Generally, a lower pressure is desired in the purification region 20 and in the casting region 22 than is desired in the melting region 18.

As seen in FIGURES 1 and 3, a plurality of housings 36, 38 and 40 are arranged within each of the regions 18, 20 and 22 respectively. Suitable electron beam generating apparatus of known design is disposed within each of the housings 36, 38 and 40 for heating the reactants in each of the regions 18, 20 and 22. As seen in FIGURE 3, the electron beam generating apparatus is suitably adjusted in order to cause the electron beam (indicated in dotted line) to travel out of the housing 38 through the slot 39 in an arcuate path and strike the surface of the reactants.

In order to operate at maximum efficiency the electron beam generating apparatus should be maintained within a region of very low pressure, and in this connection, the housings 38 and 40 are desirably connected by pipes 42 and 44 to suitable vacuum pumps 46 and 48. Similarly, the housing 36 may also be connected to a vacuum pump (not shown). The pressure within the housings 36, 38 and 40 is preferably 0.1 micron of mercury or less. Alternately, when the regions of the furnace are maintained at a sufficiently low pressure and the reactive gas does not greatly increase the total pressure in the electron beam furnace, it is not necessary to separately connect the housings in which the electron beam guns are mounted to vacuum pumps.

The columbium oxide raw materials 16 may be in any convenient form. In this connection, the columbium oxide may be mixed with a suitable reducing agent, e.g., silicon, and briquetted and placed in suitable sheet iron boxes which are vaporizable at the operating conditions within the electron beam furnace.

The briquets 16 enter the melting region 18 through the vacuum lock 14 and are directed along a chute 50 onto a support structure 52. The briquets 16 are pushed along the support structure 52 by a suitable mechanical ram 56 or other pusher device into the path of the electron beam generated by the electron beam apparatus within housing 36, the electron beam causing the raw materials to melt and flow into a hearth 58 within the melting region 18. The hearth may be formed of any suitable material, preferably water-cooled copper.

The melting region 18 is maintained at a reduced pressure of between about 1 and about 1000 microns of mercury, preferably between about 5 and about 200 microns of mercury. The electron beam apparatus within the housing 36 is initially adjusted to maintain a temperature, e.g., 1500° C., within the melting region 18 such that the columbium oxide and silicon briquet, as well as the iron boxes, are melted and a molten pool of reactants is formed at the reduced pressure.

The temperature within the hearth 58 is gradually increased by adjustment of the electron beam generating apparatus within the housing 36 so that the temperature of the molten pool of reactants is about 1800° C. when the reactants flow into the purification region 20. Optimum results are obtained when the melting region 18 of the furnace 10 is maintained at an operating pressure and temperature so that the purification is completed in the melting region 18 to the extent that the raw material feedstock is melted to form a molten pool of reactants and as much of the volatile impurities, e.g., silicon monoxide, nitrogen, sulfur, are vaporized as is economically convenient.

The removal of a maximum or optimum amount of the volatile materials, both condensible and non-condensible, at a relatively higher pressure in the melting region 18 lessens the overall volumetric pumping requirements of the vacuum pumps for a given mass flow both in the melting region 18 and in the purification region 20. Of course, the particular operating conditions within the melting region 18 will vary for different raw material feedstocks and for differing degrees of purity required in the product. However, when the raw material feedstock contains substantial amounts of volatile materials, efficient control of the operating temperature and pressure in the melting region 18 may be effected to cause the vaporization of an optimum amount of volatile materials from the molten reactants thereby enhancing the overall economics of the process. Generally, about one-half to two-thirds or more of the volatile materials present in the raw material feedstock may be vaporized in the melting region of the electron beam furnace.

The volatile and condensible materials, e.g., silicon monoxide, vaporized from the molten pool of reactants in the hearth 58 are condensed upon a condenser substrate 60 mounted above the hearth 58. The condenser substrate 60 is preferably rotatable and, as shown, is in the form of a drum which is rotatably mounted in wall 24 and a hanger 62 and is rotated by a suitable motor 64. The inner surface of the condenser 60 may be cooled by the introduction of a suitable coolant through a concentric pipe 66. Alternately, other forms of condensers may be employed or the vaporizable and condensible materials may be allowed to condense upon the walls of the melting region 18 which are at room temperature.

The molten pool of reactants is maintained within the hearth 58 in the melting region 18 for a sufficient period of time to raise the temperature of the reactants to vaporize a substantial portion of the volatile materials contained in the raw material feedstock as described above. The molten reactants are then passed through a slot 68 in the wall 24 and are delivered into a hearth 72 in the purification region 20. The hearth 72 may be constructed of a material similar to that of the hearth 58 and is preferably water cooled. The vacuum pumps 32 are suitably adjusted to maintain a reduced pressure within the purification region 20 of not more than about two microns of mercury, usually not more than 1 micron of mercury and preferably 0.1 micron of mercury or less.

The different electron beam apparatus spaced along the side of the hearth 72 within the housing 38 are controlled so that the temperature of the molten pool is gradually increased to slightly above, e.g., 50° C., the melting point of the desired columbium product at the operating conditions, e.g., 2500° C.

The increase in temperature and the further reduction in the pressure within the purification region 20 causes the vaporization of the remaining portions of the vaporizable materials present in the molten pool of reactants. The silicon monoxide and other condensible materials vaporized in the purification region 20 are condensed upon a condenser substrate 74, which may be similar in construction to the condenser substrate 60, and which is rotatably mounted in the walls 24 and 26. As shown in FIGURE 2, the condensers 60 and 74 are mounted on a single shaft and are jointly driven by the motor 64. A coolant is introduced into the condenser 74 through the concentric pipe 66.

Referring to FIGURE 3 and FIGURE 4, a view tube 78 is mounted in the wall of the purification region 20. The view tube 78 is similar to that described in the copending Hunt application, Serial No. 140,750, filed September 26, 1961, and may be employed to view the reaction occurring within the purification region 20. A plurality of pipes 80 and 82 are also mounted in the wall of the purification region 20, the exit from the pipes 80 and 82, as well as the exit from the view tube 78 being adjacent the surface of the molten pool of reactants in the hearth 72.

After substantially all of the vaporizable impurities have been vaporized from the molten pool of reactants within the purification region 20, a reactive gas, e.g., oxygen, is introduced through the pipes 80 and 82 and through the view tube 78 into contact with the surface of the molten pool of reactants in the hearth 72.

The oxygen may be introduced into the pipes 80 and 82 and into the view tube 78 from suitable containers (not shown) and may be controlled by suitable valves 84 and 86. The reactive gas introduced into the interior of the view tube 78 also acts to prevent condensation of the vaporizable materials upon the window 88 of the view tube 78 and allows observation of the reaction within the purification region 20. Alternately, the oxygen may be injected directly into the molten pool of reactants.

The oxygen reacts with the silicon remaining in the molten pool of reactants to form silicon monoxide which is vaporized at the operating conditions within the purification region 20. The oxygen also reacts with the carbon remaining in the molten pool of reactants to form carbon monoxide which is also vaporized. The silicon monoxide is condensed upon the surface of the condenser 74 and the carbon monoxide is removed by the vacuum pumps 32.

The amount of oxygen introduced into the purification region 20 is controlled so that the total pressure within the purification region is increased from about 0.1 micron to 1 micron of mercury, as measured by a conventional ion gauge 76.

The molten pool of reactants, substantially pure columbium containing minor amounts of oxygen dissolved therein, flows out of the hearth 72 through a slot 90 in the wall 26 into a water cooled ingot mold 94 within the casting region 22 forming an ingot 96. The casting region is maintained at a pressure of not more than 2 microns of mercury and the upper surface of the ingot 96 is maintained in a molten condition by an electron beam generated by suitable apparatus within the housing 40. The molten columbium is heated to a temperature slightly above the melting point of pure columbium at the operating conditions, e.g., 2500° C., to cause the vaporization of substantially all of the remaining amounts of oxygen in the columbium product as columbium oxide. If the desired metal does not form a volatile suboxide by which the oxygen content of the metal may be suitably depleted, the molten reactants may be contacted with a hydrocarbon gas, e.g., methane, either in the purification region 20 or in the casting region 22.

The solidified purified columbium ingot 96 is withdrawn from the furnace 10 through a conventional vacuum lock 98 and is further processed as may be desired.

The condensed volatile materials on the condensers 60 and 74 may be removed therefrom by suitable doctor blades (not shown) and may be removed from the furnace 10 through conventional vacuum locks (not shown).

The apparatus shown in the drawings may be suitably modified to practice a continuous process. In this connection, a continuous process is best practiced in an apparatus having an additional purification region between the melting region 18 and the purification region 20. Generally, reactive gas is not introduced into the additional purification region. The additional purification region is maintained at substantially the same temperature and pressure as purification region 20 and is utilized to effect removal of substantially all of the volatile impurities present in the desired metal before the molten pool of reactants is contacted with the reactive gas in purification region 20. In this manner, the reactive gas may be continuously injected into contact with the molten reactants in purification region 20. Further, when a continuous process is practiced, the various electron beam generating apparatus are preferably adjusted so that the temperature of the molten pool of reactants is increased from entrance to exit of each of the respective regions of the electron beam furnace and the maximum desired temperature within each of the regions is attained adjacent the exit of the region.

*Example I*

High purity columbium is produced in a batch process from powdered columbium oxide concentrates containing 92 percent columbium oxide, the remainder being mainly silicon dioxide, iron oxide and zirconium. A silicon reducing agent is admixed with the columbium oxide and is briquetted and introduced into the melting region of an electron beam furnace. The silicon is added in a stoichiometric amount, i.e., 5 mols of silicon per mol of columbium oxide. One mol of silicon is also added per mol of silicon dioxide and other residual metal oxides are compensated for by the addition of one mol of silicon per mol of oxygen present.

The melting region of the electron beam furnace is maintained at a reduced pressure of about 100 microns of mercury by vacuum diffusion pumps. The temperature in the melting region is initially adjusted to 1500° C. by suitable electron beam guns. At the operating conditions the raw material feedstock is melted and silicon monoxide vapors are evolved from the molten pool of reactants formed and are condensed upon the surface of a rotating condenser positioned directly above the hearth. The temperature of the molten pool is slowly increased to about 1800° C. and about two-thirds of the silicon monoxide capable of being formed and vaporized from the molten pool of raw materials is vaporized in the melting region.

The molten reactants at 1800° C. flow into the purification region of the electron beam furnace which is maintained at a reduced pressure of about 0.1 micron of mercury. The electron beam guns within the purification region are controlled so that the temperature of the molten pool is slowly increased to 2500° C., which is about 50° C. above the melting point of pure columbium at the operating conditions. The remaining portions of the silicon monoxide and any iron present are vaporizable from the molten pool of reactants. The molten pool within the purification region, after substantially all of the silicon monoxide and other vaporizable impurities have been vaporized, is substantially pure columbium containing 0.5 percent by weight silicon, 0.4 percent by weight zirconium and 0.3 percent by weight carbon.

Oxygen gas is then introduced into the purification region and directed against the surface of the molten pool of reactants. The amount of oxygen introduced is controlled so that the pressure within the purification region at a point spaced from the surface of the molten pool is increased about one micron of mercury. The oxygen reacts with the remaining silicon present in the molten pool of reactants as well as with the zirconium present therein to form silicon monoxide and zirconium monoxide which are vaporizable at the operating conditions within the purification region. The oxygen also reacts with the carbon present to form carbon monoxide which is vaporized at the operating conditions and removed from the furnace by the vacuum pumps.

The molten reactants are then delivered into a cooled ingot mold in the casting region of the electron beam furnace. The surface of the ingot is heated by additional electron beam guns at a pressure of about 0.1 micron of mercury to a temperature of about 2500° C. at which temperature the remaining oxygen dissolved in the molten reactants is vaporized therefrom in the form of columbium monoxide. The purified columbium ingot is withdrawn from the cooled ingot mold mechanism through a vacuum lock. The columbium product obtained analyzed less than 20 p.p.m. of oxygen, 20 p.p.m. nitrogen, 5 p.p.m. hydrogen, 20 p.p.m. iron, 30 p.p.m. silicon and 15 p.p.m. carbon.

*Example II*

High purity molybdenum is produced in an electron beam furnace in a continuous process. A molybdenum oxide ore concentrate is mixed with a stoichiometric amount of silicon and is melted in the melting region of the electron beam furnace at a pressure of 100 microns of mercury and at a temperature of 1700° C. The temperature of the molten pool of reactants is increased to 2000° C. adjacent the exit from the melting region, causing about two-thirds vaporization of the silicon monoxide from the molten pool of reactants.

The molten reactants at 2000° C. are delivered into a first purification region of the furnace and are further heated at a pressure of 0.1 micron of mercury. The temperature within the purification region is raised to slightly above the melting point of pure molybdenum at the operating conditions, i.e., 2700° C. with the vaporization of the remaining silicon monoxide and other volatile impurities. The molten pool of reactants contains substantially pure molybdenum containing 0.4 percent silicon and 0.2 percent carbon.

The molten pool of reactants is then introduced into a second purification region maintained at 0.1 micron of mercury and at 2700° C. and contacted with an amount of oxygen sufficient to raise the pressure within the second purification region at a point spaced from the surface of the molten pool about 0.1 micron of mercury. The oxygen reacts with the silicon and carbon to form silicon monoxide and carbon monoxide which are vaporized from the molten pool of molybdenum.

The molten pool of molybdenum is delivered into the cooled ingot mold in the casting region and is heated to a temperature of 2700° C. at a pressure of 0.1 micron of mercury by the electron beam guns in the casting region causing the vaporization of molybdenum monoxide. The molybdenum analyzes less than 20 p.p.m. silicon, 15 p.p.m. carbon, and 5 p.p.m. oxygen.

*Example III*

A uranium ingot which has been partially purified by an electron beam purification process and which contains 0.2 percent silicon and 0.1 percent carbon is melted in an electron beam furnace at a pressure of 0.1 micron of mercury and at a temperature of 1500° C.

Oxygen is introduced into the electron beam furnace adjacent the surface of the molten pool of uranium in an amount so that the pressure within the electron beam furnace is raised about 0.5 micron of mercury. The oxygen reacts with the silicon and with the carbon to form silicon monoxide and carbon monoxide which are vaporized at the operating conditions. A purified uranium ingot is obtained from the electron beam furnace which analyzes less than 50 p.p.m. oxygen, 100 p.p.m. silicon and 30 p.p.m. carbon.

*Example IV*

A highly purified alloy of 10 weight percent tungsten and 90 weight percent tantalum is produced from a partially purified tantalum-tungsten ingot in an electron beam furnace. The partially purified tungsten-tantalum ingot contains 0.5 percent silicon, 0.05 percent carbon.

The tungsten-tantalum ingot is melted in the electron beam furnace at a pressure of 0.1 micron of mercury and is heated to a temperature of 3100° C., which is slightly above the melting point of the pure tungsten-tantalum alloy at the operating conditions. The surface of the molten pool of tungsten-tantalum alloy is contacted with oxygen gas which reacts with the silicon and carbon in the molten pool to form silicon monoxide and carbon monoxide which are vaporized at the operating conditions within the electron beam furnace.

The oxygen is added in an amount so that the pressure within the electron beam furnace at a point spaced from the surface of the molten pool is increased about one micron of mercury. The tungsten-tantalum alloy obtained analyzes less than 10 p.p.m. oxygen, 15 p.p.m. nitrogen, 3 p.p.m. hydrogen, 30 p.p.m. iron, 15 p.p.m. carbon and 20 p.p.m. silicon.

*Example V*

Highly purified tantalum is produced from tantalum oxide ores in a two stage purification process. The tantalum oxide ores are first reduced in an atmospheric reduction stage with a stoichiometric amount of silicon. The atmospheric stage reduction process is carried out so that a crude intermediate tantalum product is obtained which contains about 2 weight percent silicon, about 0.03 weight percent nitrogen, 0.3 weight percent oxygen and 0.04 weight percent carbon.

The crude intermediate tantalum product is then further purified in an electron beam reduction stage at a reduced pressure of 0.1 micron of mercury and at a temperature of 3000° C. to 3100° C. Any remaining silicon monoxide is vaporized at the operating conditions within the electron beam furnace along with other remaining vaporizable impurities. The molten pool of reactants is then contacted with an amount of oxygen sufficient to increase the pressure within the electron beam furnace at a point spaced from the surface of the molten pool about 5 microns of mercury. The oxygen reacts with the silicon and carbon present in the molten pool to form silicon monoxide and carbon monoxide which are vaporized at the operating conditions.

A purified tantalum product is obtained which analyzes less than 10 p.p.m. oxygen, 10 p.p.m. nitrogen, 1 p.p.m. hydrogen, 10 p.p.m. iron, 15 p.p.m. carbon and 20 p.p.m. silicon.

It can be seen that a process has been provided which produces metals and metal alloys in a higher degree of purity than has heretofore been obtainable and allows the removal of certain impurities from the desired metal product that have heretofore not been able to be removed in an electron beam purification process. The described process may be performed in either batch or continuous manner and is both economical and convenient. It is understood that the other refractory metals such as tungsten, molybdenum, hafnium, rhenium, as well as the other lanthanide rare earth metals and actinide rare earth metals can be purified by the disclosed process and are within the scope of the invention.

Various of the features of the present invention are set forth in the following claims.

What is claimed is:

1. A method for the manufacture of a highly purified metal selected from the group consisting of refractory metals, lanthanide rare earth metals, actinide rare earth metals and alloys thereof from a mixture of said metal and an impurity metal which forms a volatile suboxide, which method comprises, melting said mixture in an electron beam furnace at a reduced pressure of not more than 1000 microns of mercury and at a temperature sufficient to provide a molten pool of said mixture, contacting said molten pool with oxygen, reacting said oxygen and said impurity metal to form an impurity metal suboxide that is capable of being substantially vaporized from said molten pool without vaporizing a substantial amount of said metal, and recovering said metal in a purified form.

2. A method for the manufacture of a highly purified metal selected from the group consisting of refractory metals, lanthanide rare earth metals, actinide rare earth metals and alloys thereof from a mixture of said metal and an impurity metal which forms a volatile suboxide, which method comprises, melting said mixture in an electron beam furnace at a reduced pressure of not more than 1000 microns of mercury and at a temperature sufficient to provide a molten pool of said mixture, contacting said molten pool with an amount of oxygen sufficient to increase the pressure within said furnace by an amount from about 0.001 micron of mercury to about 1 millimeter of mercury, reacting said oxygen and said impurity metal to form an impurity metal suboxide that is capable of being substantially vaporized from said molten pool without vaporizing a substantial amount of said metal, and recovering said metal in a purified form.

3. A method for the manufacture of a highly purified metal selected from the group consisting of refractory metals, lanthanide rare earth metals, actinide rare earth metals and alloys thereof from a mixture of said metal and an impurity substance selected from the group consisting of oxygen, sulfur, and mixtures thereof, which method comprises, melting said mixture in an electron beam furnace at a reduced pressure of not more than 1000 microns of mercury and at a temperature sufficient to provide a molten pool of said mixture, contacting said molten pool with an amount of a hydrocarbon gas selected from the group consisting of methane, ethane, and propane and mixtures thereof, sufficient to increase the pressure within said furnace by an amount from about 0.001 micron of mercury to 1 millimeter of mercury, reacting said hydrocarbon gas and said impurity substance to form a compound capable of being vaporized from said molten pool at said pressure and said temperature without vaporizing a substantial amount of said metal, and recovering said metal in a purified form.

4. A method for the manufacture of a highly purified metal selected from the group consisting of refractory metals, lanthanide rare earth metals, actinide rare earth metals and alloys thereof from a mixture of said metal and impurity substances at least a portion of which are metals which form a volatile suboxide, which method comprises, melting said mixture in an electron beam furnace at a reduced pressure of not more than 1000 microns of mercury and at a temperature sufficient to provide a molten pool of said mixture, contacting said molten pool with oxygen, reacting said oxygen and said impurity metal to form an impurity metal suboxide that is capable of being substantially vaporized from said molten pool without vaporizing a substantial amount of said metal, contacting said molten pool with an amount of a hydrocarbon gas selected from the group consisting of methane, ethane and propane and mixtures thereof sufficient to increase the pressure within said furnace by an amount from about 0.001 micron of mercury to 1 millimeter of mercury, reacting said hydrocarbon gas and said remaining impurity substances to form a compound capable of being vaporized from said molten pool at said pressure and said temperature without vaporizing a substantial amount of said metal, and recovering said metal in a purified form.

5. A method for the manufacture of a highly purified metal selected from the group consisting of refractory metals, lanthanide rare earth metals, actinide rare earth metals and alloys thereof from a mixture of an oxide of said metal, a reducing agent capable of reducing said metal and an impurity substance that cannot be readily vaporized from said mixture without substantial vaporization of said metal, which method comprises the steps of reacting said mixture in a first region of an electron beam furnace to produce reducing agent oxides at a reduced pressure of about 1 micron to about 1000 microns of mercury and at an elevated temperature sufficient to provide a molten pool of said mixture and to vaporize a major portion of said reducing agent oxides at said pressure, further reacting said molten mixture in a second region of said furnace at a reduced pressure of not more than 2 microns of mercury and at a higher temperature sufficient to vaporize substantially all of said reducing agent oxides remaining in said molten mixture but insufficient to vaporize a substantial amount of said metal, contacting said molten mixture in a third region of said furnace with an amount of a reactive gas selected from the group consisting of oxygen and an unsubstituted alkane having from one to three carbon atoms sufficient to increase the pressure within said third region by an amount from about 0.001 micron to about 1 millimeter of mercury, reacting said reactive gas with said impurity substance and any remaining reducing agent present in said molten mixture to form compounds that are capable of being vaporized in said third region without causing vaporization of a substantial amount of said metal, and recovering said metal in purified form.

6. A method for the manufacture of a highly purified metal selected from the group consisting of refractory metals, lanthanide rare earth metals, actinide rare earth metals and alloys thereof from a mixture of an oxide of said metal, a reducing agent capable of reducing said metal and an impurity substance which cannot be readily vaporized from said mixture without substantial vaporization of said metal, which method comprises the steps of reacting said mixture at ambient pressure to form reducing agent oxides and separating said reducing agent oxides to provide a crude intermediate product, heating said intermediate product in an electron beam furnace at a reduced pressure of not more than 1000 microns of mercury and at an elevated temperature sufficient to form a molten pool of said intermediate product and to vaporize any remaining of said reducing agent oxides present in said molten intermediate product without vaporizing a substantial amount of said metal, contacting said molten intermediate product in said electron beam furnace with an amount of a reactive gas selected from the group consisting of oxygen and an unsubstituted alkane having from one to three carbon atoms sufficient to increase the pressure within said electron beam furnace by an amount from about 0.001 micron to about 1 millimeter of mercury, reacting said reactive gas with said impurity substance and any remaining reducing agent present in said molten intermediate product to form compounds that are capable of being vaporized in said electron beam furnace without causing vaporization of a substantial amount of said metal, and recovering said metal in purified form.

7. A method for the manufacture of a highly purified metal selected from the group consisting of refractory metals, lanthanide rare earth metals, actinide rare earth metals and alloys thereof from a mixture of an oxide of said metal and silicon, which method comprises the steps of reacting said mixture in a first region of an electron beam furnace to produce silicon monoxide at a reduced pressure of about 1 micron to about 1000 microns of mercury and at an elevated temperature sufficient to provide a molten pool of said mixture and to vaporize a major portion of said silicon monoxide at said pressure, further reacting said molten mixture in a second region of said furnace at a pressure of not more than 2 microns of mercury and at a higher temperature sufficient to vaporize substantially all of said silicon monoxide remaining in said molten mixture but insufficient to vaporize a substantial amount of said metal, contacting said molten mixture in said second region with an amount of oxygen sufficient to increase the pressure within said second region by an amount from 0.001 micron to 1 millimeter of mercury, reacting said oxygen and any remaining silicon present in said molten mixture to form silicon monoxide, and recovering said metal in purified form.

8. A method for the manufacture of a highly purified metal selected from the group consisting of refractory metals, lanthanide rare earth metals, actinide rare earth metals and alloys thereof from a mixture of an oxide of said metal and silicon, which method comprises the steps of reacting said mixture at ambient pressure to form silicon oxides and separating said silicon oxides to provide a crude intermediate product, heating said intermediate product in an electron beam furnace at a reduced pressure of not more than 1000 microns of mercury and at an elevated temperature sufficient to form a molten pool of said mixture and to vaporize any remaining of said silicon oxides present in said molten intermediate product without vaporizing a substantial amount of said metal, contacting said molten mixture in said electron beam furnace with an amount of oxygen sufficient to increase the pressure within said second region by an amount from 0.001 micron to 1 millimeter of mercury, reacting said oxygen and any remaining silicon present in said molten mixture to form silicon monoxide, and recovering said metal in purified form.

References Cited by the Examiner

UNITED STATES PATENTS

| | | | |
|---|---|---|---|
| 3,008,887 | 11/1961 | Herglotz | 204—164 |
| 3,084,037 | 4/1963 | Smith | 75—84 X |
| 3,091,525 | 5/1963 | Hunt | 75—84 |
| 3,099,614 | 7/1963 | Sheer et al. | 204—164 |

BENJAMIN R. PADGETT, *Primary Examiner.*

CARL D. QUARFORTH, REUBEN EPSTEIN,
*Examiners.*

M. J. SCOLNICK, *Assistant Examiner.*